US012571242B2

(12) United States Patent
Jean et al.

(10) Patent No.: US 12,571,242 B2
(45) Date of Patent: Mar. 10, 2026

(54) DEVICE FOR CLOSING AN OPENING PROVIDED IN THE BODY OF A VEHICLE EQUIPPED WITH AN END FITTING FORMING A MECHANICAL STOP FOR A SLIDING SHUTTLE, AND CORRESPONDING VEHICLE

(71) Applicant: ADVANCED COMFORT SYSTEMS FRANCE SAS—ACS FRANCE, Bressuire (FR)

(72) Inventors: Anthony Jean, Haute-Goulaine (FR); Thierry Turc, Bressuire (FR); Maxime Nee, Bressuire (FR)

(73) Assignee: ADVANCED COMFORT SYSTEMS FRANCE SAS—ACS FRANCE, Bressuire (FR)

( * ) Notice: Subject to any disclaimer, the term of this patent is extended or adjusted under 35 U.S.C. 154(b) by 0 days.

(21) Appl. No.: 18/044,578

(22) PCT Filed: Sep. 10, 2021

(86) PCT No.: PCT/EP2021/074941
§ 371 (c)(1),
(2) Date: Mar. 9, 2023

(87) PCT Pub. No.: WO2022/053619
PCT Pub. Date: Mar. 17, 2022

(65) Prior Publication Data
US 2023/0374835 A1 Nov. 23, 2023

(30) Foreign Application Priority Data
Sep. 11, 2020 (EP) .................................... 20195748

(51) Int. Cl.
*E05D 15/06* (2006.01)
*B60J 1/18* (2006.01)
(Continued)

(52) U.S. Cl.
CPC ........ *E05D 15/0608* (2013.01); *B60J 1/1853* (2013.01); *B60J 10/30* (2016.02);
(Continued)

(58) Field of Classification Search
CPC ..... E05D 15/0608; B60J 10/79; B60J 1/1853; E05F 15/655
See application file for complete search history.

(56) References Cited

U.S. PATENT DOCUMENTS 5,613,323 A * 3/1997 Buening ................ B60J 1/1853
49/130
2005/0044799 A1 * 3/2005 Kinross ............... E05D 15/1047
49/413
(Continued)

FOREIGN PATENT DOCUMENTS

CN 103025551 A 4/2013
CN 105026196 A 11/2015
(Continued)

*Primary Examiner* — Marcus Menezes
(74) *Attorney, Agent, or Firm* — S.J. Intellectual Property Ltd.

(57) ABSTRACT
A closing device of an opening provided in a structure, comprising a fixed part, wherein an opening is defined, and at least one sliding movable panel guided along two guide rails fitted on one face of the fixed panel, between a closing position, sealing the opening, in a sealing plane defined by the fixed panel, and at least one opening position, in a sliding plane, substantially parallel with the sealing plane, each of the rails bearing at least one shuttle guided in translation in the rail, movable in translation in the guide rails, and switching the movable panel from the sealing position to the at least one sliding position, and slidably moving the movable panel in the sealing plane. According to the invention, at least one of the rails bears, at one of the ends thereof, an end fitting forming a mechanical stop defining a stop position for the shuttle.

8 Claims, 5 Drawing Sheets

(51) Int. Cl.
  B60J 10/30 (2016.01)
  B60J 10/79 (2016.01)
  *E05F 15/655* (2015.01)

(52) U.S. Cl.
  CPC ............. B60J 10/79 (2016.02); *E05F 15/655* (2015.01); *E05Y 2201/64* (2013.01); *E05Y 2600/456* (2013.01); *E05Y 2600/51* (2013.01); *E05Y 2600/632* (2013.01); *E05Y 2900/55* (2013.01)

(56) References Cited

U.S. PATENT DOCUMENTS

2008/0100093 A1 *  5/2008  Seiple ................... B60J 1/2036
                                                      296/146.16
2021/0262263 A1 *  8/2021  Kuroda .................. E05F 15/60

FOREIGN PATENT DOCUMENTS

| | | |
|---|---|---|
| DE | 102006035632 A1 | 2/2008 |
| DE | 102007017136 A1 | 10/2008 |
| EP | 0778168 A1 | 6/1997 |
| EP | 0857844 A1 | 8/1998 |
| EP | 2072720 A1 | 6/2009 |
| EP | 2098395 A1 | 9/2009 |
| FR | 2833212 A1 | 6/2023 |
| GB | 1128398 A | 9/1968 |
| WO | 2010146185 A2 | 12/2010 |
| WO | 2015064266 A1 | 5/2015 |

* cited by examiner

DEVICE FOR CLOSING AN OPENING PROVIDED IN THE BODY OF A VEHICLE EQUIPPED WITH AN END FITTING FORMING A MECHANICAL STOP FOR A SLIDING SHUTTLE, AND CORRESPONDING VEHICLE

1. FIELD OF THE INVENTION

The field of the invention is that of the equipment of windows, particularly used in motor vehicles.

More specifically, the invention relates to devices for sealing a window arranged in a structural element, for example in the body of a vehicle, or in the vehicle door, and comprising a sliding movable part capable of releasing or closing an opening while offering a flush appearance, viewed externally.

The invention can particularly equip different types of structures, such as caravans, camping cars, coaches and buses, minibuses, truck, vans, boats, etc.

Such devices, developed for several years by the holder of the present application, are particularly referred to as "flush window".

In other words, these devices are designed in order to have, viewed externally, a flush or almost flush appearance between the body, or more generally the wall or the structure, and the fixed panel of the device.

2. PRIOR ART

The general principle of this technique is particularly described in the patent documents EP-0 778 168 and EP-0 857 844.

The sealing device (hereinafter called "flush window") comprises a fixed part and a movable part in relation to this fixed part, or sliding panel.

The movable part is connected to the fixed assembly by functional elements which provide the required mobility and which are mounted on the face of the fixed part facing the vehicle interior.

These functional elements, or rails, fulfil a movable panel guidance and holding function. They are placed on the face oriented towards the vehicle interior, at a sufficient distance from the edges, or the periphery, of the fixed part so that this periphery can be secured directly to the edges of the window, without the rails interfering. It is thus possible to avoid the presence of a connection frame between the edges of the window and the fixed part.

This fixed part can be made of one or more elements (placed side by side in the same plane), for example made of glass or polycarbonate.

Such a flush window can thus be fitted entirely independently of the vehicle, and mounted, from the outside, into the receptacle defined for this purpose by the window, or the receptacle, defined in the body, or more generally in the wall.

The edges of the fixed part are secured, for example using a bead of adhesive, to the edges of the window, without any other intermediate connection element.

In aesthetic terms, the flush window has, viewed externally, a smooth, flush appearance, in that no frame is required on the contour of the opening formed in the fixed assembly.

To move the movable part, generally consisting of a transparent panel, a guidance device is therefore provided, including a first and a second guide rails fixedly fitted on the fixed part (or fixed structure) of the window, on either side of the opening closed by the movable panel.

The movable panel is fitted, via shuttles, on the rails, to slide for example along a longitudinal direction, in a sliding plane between one (or more) opening position and a closing position, wherein it seals the opening.

To maximise the flush appearance, it was proposed that, in the closing position, the movable panel be part of the plane of the fixed part, by switching from an intermediate release position, in the sliding plane, facing the opening and released therefrom in the closing position.

It will be noted that the term "plane" should be understood here in a broader sense: the plane formed by the window is sometimes curved, along one, or two, directions to adapt to the shape of the structure (this also justifies the term "substantially" used in the description and the claims).

The movable panel can be moved manually or using an electric motor. In the latter case, actuation means act upon one of the shuttles present in the rails in order to move the movable panel between a closed position and at least one open position. The actuation means can particularly be in the form of a cable (so-called Push-Pull cable) connected to the electric motor so as to pull or push the movable panel. The actuation means can also be in the form of a rack or bicycle cable type cables.

In the case of a motorised drive of the movable panel, the applicant observed however that the movement of the shuttle in the rail could be excessive and/or irregular, particularly when the motorised drive is defective, which can be particularly detrimental to the operation and/or the integrity of the sealing device.

Therefore, there is a need to provide a novel technique for guiding and/or stopping a movable panel of a flush window of a structure, such as a motor vehicle or similar, enabling the switch from a sealing position, flush with the fixed panel, to a sliding position, which is simple, effective and reliable.

There is also a need to provide a technique which remedies or reduces some harmful and undesirable effects appearing in the guide rails of such a sealing device (moisture and noise pollution, for example).

There is also a need to provide, at least cost, a technique of simple manufacture, assembly and/or maintenance.

3. SUMMARY OF THE INVENTION

The technique of the invention makes it possible to resolve at least some of the drawbacks raised by the prior art. More specifically, the proposed technique relates to a device for sealing a window arranged in a structure, comprising a fixed part, wherein an opening is defined, and at least one movable sliding panel guided along two guide rails fitted on one face of said fixed panel, between a closing position, sealing said opening, in a first plane defined by said fixed panel, referred to as sealing plane, and at least one opening position, in a second plane, referred to as sliding plane, substantially parallel with said sealing plane, each of said guide rails bearing at least one shuttle guided in translation in said rail, movable in translation in said guide rails, and switching the movable panel from said sealing position to said at least one sliding position, and vice versa, and slidably moving said movable panel in said sealing plane.

According to the proposed technique, at least one of said rails bears, at one of the ends thereof, an end fitting forming a mechanical stop defining a stop position for said shuttle.

Thus, simply and effectively, any excessive movement of the shuttle in the guide rail at the end of the rail having the end fitting forming a stop is avoided. Such excessive movements particularly occur when the motorised drive of the shuttle in question deviates, for reasons of disrepair for example, in relation to a control signal. This particularly makes it possible to prevent any locking of the sealing device in the closed or fully open position of the movable panel. The reliability of the sealing device is thus improved.

Such an end fitting forming a stop furthermore makes it possible to contribute to the initiation of the motorised drive of the shuttle. More specifically, initiation consists of actuating the motorised drive until the shuttle comes into contact with the end fitting, defining this position as the stop position of the shuttle and saving it in a control unit of this motorised drive. Then, this control unit determines/computes an end-of-travel position of the shuttle, located slightly upstream from the stop position, used as a control signal of the motorised drive. Such an initiation sequence is carried out regularly, for example every two hundred movable panel opening/closing cycles, to detect any drift of the motorised drive and correct the control signal thereof accordingly in order to prevent the shuttle from colliding with the end fitting forming a mechanical stop. Thus, the end fitting forming a stop improves the reliability of the sealing device further.

Moreover, forming the mechanical stop with an end fitting separate from the guide rail makes it possible to mount this end fitting easily on rails of existing sealing devices.

According to a specific embodiment of the present technique, said rail is a profile and said end fitting is a plastic part comprising at least one portion capable of interlocking in at least complementary portion of said profile.

Such interlocking particularly makes it possible to improve the hold of the end fitting forming a mechanical stop in the guide rail, or ensure on its own the assembly of two elements in question. Thus, it is possible to mount the end fitting forming a mechanical stop on rails requiring no, or minimal, adaptation of the structure of existing sealing devices.

According to a further specific embodiment of the present technique, said end fitting is secured to said rail by screwing.

Such screwing makes it possible to provide, at least cost and effectively, a reversible attachment of the end fitting forming a mechanical stop in the guide rail. Thus, the replacement of a damaged end fitting by a new one is relatively easy.

According to a further specific embodiment of the present technique, said end fitting bears a track for guiding a pin rigidly connected to said movable panel.

Such a track makes it possible to progressively guide a pin borne by the movable panel from a sliding track, substantially oriented along the longitudinal axis of the vehicle, to a notch for receiving said pin in the final position of the movable panel (closed for example). Thus, the end fitting forming a mechanical stop furthermore helps contribute to guiding the movable panel in order in particular to prevent the presence of jerks when the latter reaches the final position.

According to a specific aspect of the present technique, said end fitting bears an element for managing the water present in said rail and discharging it outside.

The presence of water in the rails can particularly be due to the water initially present on the face of the sealing device facing the vehicle interior, due to condensation or washing of the vehicle interior for example, which flows along the edges of the sealing device until it reaches the bottom rail.

Such a management and discharge element particularly makes it possible to collect the water present in the rail and discharge it outside the vehicle. The presence of stagnant water in the rail and the annoyances that would result, both for the vehicle occupants (odour in particular) and for the sealing device (operation and premature wear in particular) are thus avoided.

Preferably, said management and discharge element comprises a vessel for collecting water and a planar portion having at least one baffle, extending below said vessel.

Such an arrangement of water discharge means, formed by the planar portion and the at least one baffle, makes it possible to effectively discharge the water present in the vessel outside the vehicle while minimising the risk of outside water entering the management and discharge element, and therefore the sealing device. For example, when the vehicle exterior is cleaned with a high-pressure water jet, the water does not enter the discharge means, at least not in sufficient amounts to reach the vessel, despite the pressure of the jet. Thus, the reliability of the sealing device is particularly improved.

In particular, said management and discharge element can comprise, above the level of said rail, a portion for recovering and guiding the water to said vessel, particularly when said structure is inclined.

Such a recovery and guidance portion particularly makes it possible to recover and reroute to the vessel the water emerging therefrom. Such a situation can particularly be observed when the vehicle is in a substantially inclined position, in the direction X (length of the vehicle) and/or Y (width). This can for example occur when the vehicle travels on a steep road or is parked on an inclined surface.

More preferably, said planar portion provides a link between said rail and said structure.

In this way, the management and discharge element ensures, at least contributes to, the holding in position of the sealing device on the structure in the event of breakage of the fixed part of the device. Thus, the safety of the vehicle occupants is particularly improved particularly in the event of an accident.

More preferably, said management and discharge element comprises an over-moulding and/or a seal ensuring the tightness of said rail.

The proposed technique also relates to a motor vehicle comprising at least one sealing device as described above.

4. LIST OF THE FIGURES

The proposed technique, as well as the different advantages thereof, will be understood more easily, in light of the following description of two illustrative and non-limiting embodiments thereof, and from the appended drawings wherein.

5. DETAILED DESCRIPTION OF THE INVENTION

Different embodiments of the proposed technique, treated as mere illustrative and non-limiting examples, are illustrated hereinafter, with reference to FIGS. 1 to 9 referring directly or indirectly to a side wall of a motor vehicle.

The proposed technique can be applied in the same way to other structures having a wall wherein a window is defined, such as, for example, a caravan or a camping car. In particular, the window can be formed in a side wall of the vehicle (for example for utility vehicles, multi-purpose vehicles, estate cars, etc.), in a wall facing the rear of the vehicle (for example for pick-up trucks), or in a door. It may for example consist of a vehicle separator window.

The general operation of an example of a sealing device according to the proposed technique is first of all described with reference to FIGS. 1 and 2. A first embodiment of the proposed technique (also seen in FIG. 2) is then described with reference to FIGS. 3 and 4, as well as a second embodiment of the proposed technique with reference to FIGS. 5A to 9.

Hereinafter, equivalent elements have been designated with equivalent references in the different figures.

5.1. General Operation of the Sealing Device

Figures 1, 2:
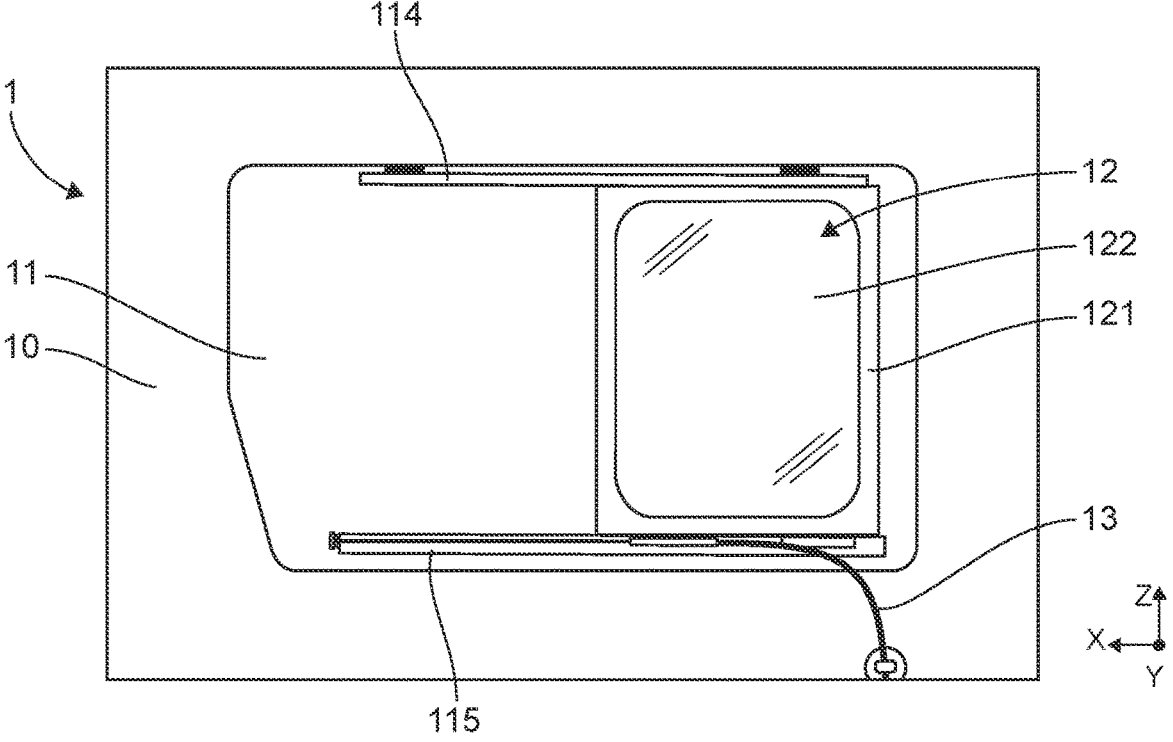
FIG. 1 illustrates an example of a sealing device according to the proposed technique.
FIG. 2 illustrates a partial view of the sealing device in FIG. 1 focused on the front part of the bottom guide rail comprising certain members contributing to the sliding of the movable panel.

FIG. 1 illustrates a slidably movable panel sealing device viewed from the vehicle interior. FIG. 2 illustrates, in a partial top view, certain members contributing to the sliding of the movable panel when the latter is in the closed position.

Such a sealing device 1 is present in the form of an assembly, or "flush window", ready to be placed in a window (i.e. an opening, or a "hole") arranged in the body 10 (side wall for example) or a door, or more generally in the structure of a vehicle (or a caravan or a camping car, for example), or more generally of a wall to receive a sealing device equipped with an opening.

Such a sealing device comprises a fixed part 11, i.e. remaining stationary with respect to the structure 10 which receives it, and a slidably movable panel, or sliding panel, 12, movable in relation to the fixed part 11.

The fixed part 11, also referred to as fixed panel, can particularly be made of glass or of polycarbonate, from one or more elements.

The fixed part 11 is perforated with an opening sealing by the movable panel 12 in the position in FIG. 1 and extending in the same plane as the fixed part 11.

The movable panel 12 particularly includes a glazed portion 122 and a frame 121.

Guide rails, respectively a top rail 114 and a bottom rail 115, made of a profiled material, are mounted by bonding on the face of the fixed part 11 facing the vehicle interior. It is noted that these rails are removed from the contour of the fixed part 11, and are not involved in, and do not impede, the securing thereof to the edge of the window.

The rails 114 and 115, which are substantially parallel in this example, hold and slidably guide the movable panel 12, which has a frame 121 rigidly connected to the rails 114, 115.

The movable panel 12 can be moved along the rails 114, 115, in a sliding plane substantially parallel to the plane defined by the fixed part 11.

The movable panel 12 can completely seal the opening of the fixed part 11 (FIG. 1) or partially or fully release this opening. Thus, the movable panel 12 can adopt one or more opening positions, according to the position thereof in relation to the rails 114, 115.

Moreover, the movable panel 12 can move perpendicularly to the plane defined by the fired part 11, so as to seal the opening, in a closed position (FIG. 1), wherein it is flush with this fixed part 11, so as to propose a flush assembly (body 10, fixed part 11 and movable part 12).

The face of the fixed part 11 facing the vehicle interior furthermore bears a seal (not shown) bonded on the contour of the opening, the end of the lip whereof presses on the movable panel 12, when the latter is in the sealing position.

The top rail 114 bears a top shuttle (not shown) and the bottom rail 115 bears a bottom shuttle 2 (FIG. 2).

More specifically, the top 114 and bottom 115 rails are rails comprising a bottom wall and two side walls extending perpendicularly to the bottom wall. The other end of the side walls has a short return for receiving and holding the top and bottom shuttles. The structure of the guide rails will be detailed subsequently during the description of the different embodiments of the invention.

The top and bottom shuttles are each presented in the form of a rod of suitable dimensions for sliding in the guide rails and have front and rear tracks capable of cooperating with pins 124 borne by the movable panel 12.

These tracks make it possible, during the movement of the shuttles, to actuate the movable panel 12, in relation to the fixed part 11, according to a movement that can be broken down into two independent movements, namely:

a perpendicular movement (along the axis Y) towards the vehicle interior in two stages (referred to as staggering) in relation to the plane formed by the fixed part 11, enabling the switch from a closed and locked position, wherein the movable panel 12 is located in the same plane as the fixed part 11 and the opening, to an intermediate release position, wherein the movable panel 12 is offset in relation to the fixed part 11 facing the opening and released therefrom, in a sliding plane, so as to enable this sliding. The movable panel 12 is thus movable along a release direction perpendicular to the sliding direction, and a movement in the sliding plane (along the axis X), parallel with the plane formed by the fixed part 11.

Obviously, other movements are possible. For example, the movable panel can follow a curve along which the two movements (locking/unlocking and sliding) are linked.

The movement of the movable panel 12 is particularly provided via a "push pull" type control cable, or drive cable, 13, coupled with the bottom shuttle 2 and driven by motorised means controlled by a user.

According to the proposed technique, at least one of the guide rails bears, at one of the ends thereof, an end fitting forming a mechanical stop defining a stop position for the shuttle.

Such an end fitting can particularly contribute to the initiation of the motorised drive of the shuttle, and in the event of malfunction of this motorised drive, interrupt the movement of the shuttle in question abutting against it. This therefore particularly makes it possible to prevent a partial extraction of the shuttle from the guide rail wherein it moves.

Optionally, the end fitting forming the mechanical stop can have or receive an element for managing the water, and more generally any liquid, present in the rail and discharging it outside.

Such a management and discharge element, different examples of which will be described hereinafter, makes it possible to collect the water present in the rail and discharge it outside the vehicle.

5.2 First Embodiment

An example of a sealing device according to a first embodiment of the proposed technique is described with reference to FIGS. 3 and 4. Only the elements of the sealing device centring around the proposed technique will be described hereinafter in order to simplify the comprehension thereof.

Figure 3:
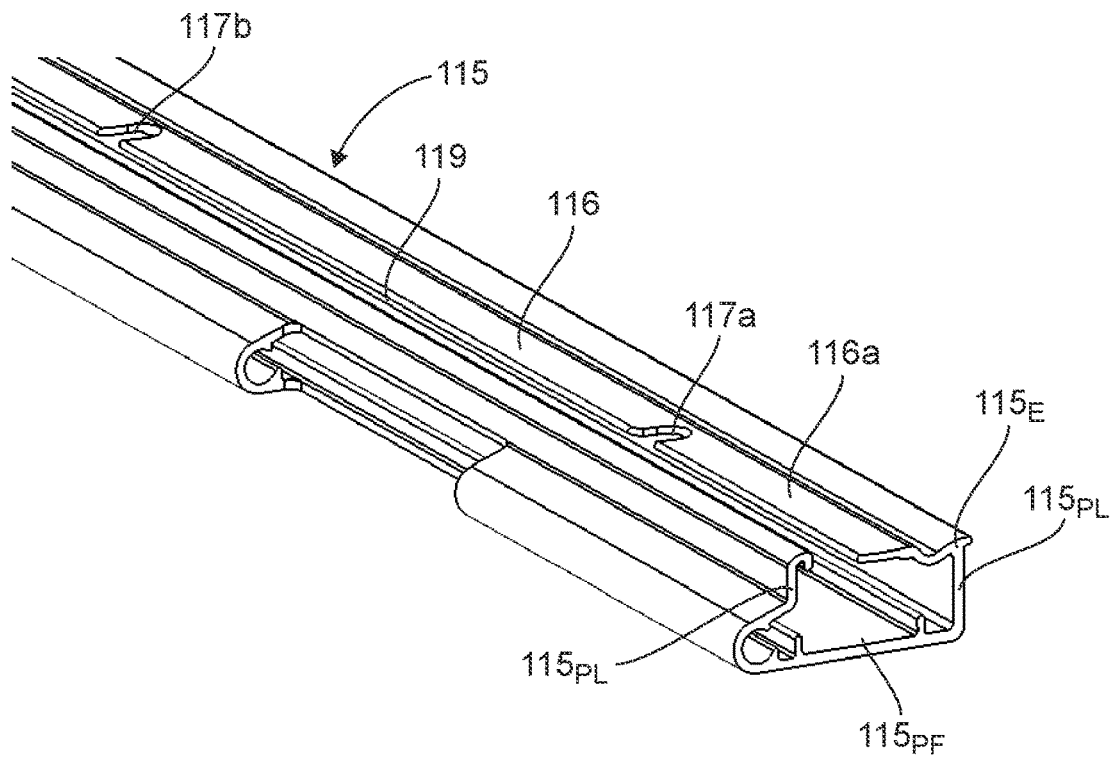
FIG. 3 illustrates a partial view of an example of a bottom sealing device rail configured to receive an end fitting forming a mechanical stop according to a first embodiment of the proposed technique.

FIG. 3 illustrates, in an elevated perspective view, a front portion of an example of a bottom sealing device rail configured to receive an end fitting forming a mechanical stop according to a first embodiment of the proposed technique.

The bottom rail 115, corresponding to that in FIG. 2, is a profile comprising a bottom wall $115_{PF}$ and two side walls $115_{PL}$ extending perpendicularly to the bottom wall. The side wall $115_{PL}$ located on the exterior side of the vehicle comprises a return 116 which extends perpendicularly thereto and towards the vehicle interior.

The return 116, forming the top wall of the bottom rail 115, defines a track 119 for moving the pins of the movable panel, along the axis X, during the movement thereof from a closed position to the opening position(s), and vice versa.

The return 116 has two notches, namely a front notch 117a and a rear notch 117b, configured to each receive one of the pins 124 borne by the movable panel when the latter is in the closed position, as illustrated in FIG. 2.

The shapes and dimensions of the front and rear notches 117a, 117b are therefore complementary with those of the pins of the movable panel.

In other words, the bottom rail comprises a bottom wall and two side walls extending perpendicularly to the bottom wall. The side wall located on the side of the vehicle comprises a return which extends perpendicularly thereto and towards the vehicle interior. The return has two notches, namely a front notch and a rear notch, configured to each receive a pin borne by the movable panel when the latter is in the closed position.

In the example illustrated, the front and rear notches 117a, 117b, substantially "U"-shaped, extends perpendicularly to the track 119, i.e. towards the vehicle exterior along the axis Y.

The front notch 117a is furthermore located at a distance from the front end $115_E$ of the bottom rail 115, i.e. the end of the bottom rail 115 located towards the front of the vehicle. In other words, a portion 116a of the return 116 is present between the front notch 117a and the end $115_E$ of the bottom rail 115.

Figure 4:
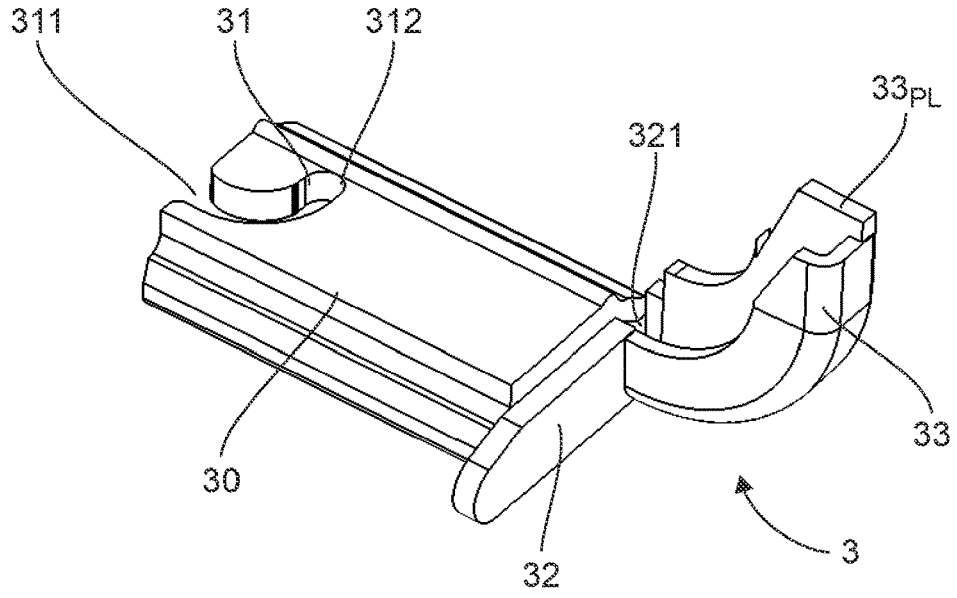
FIG. 4 illustrates an elevated perspective view of an example of an end fitting forming a mechanical stop according to a first embodiment of the proposed technique.

FIG. 4 illustrates, in an elevated perspective view, an end fitting forming a mechanical stop according to a first embodiment of the proposed technique.

The end fitting 3 comprises a body, or portion, 30 having a complementary shape with the front end $115_E$ of the bottom rail 115 and is configured to be inserted therein.

The body 30 of the end fitting 3 is sized so as to cooperate with a front end of the bottom shuttle when the movable panel in the closed position.

One or more attachment means (not shown) are provided to secure the end fitting 3 to the bottom rail 115 in order to form a mechanical stop of the bottom shuttle.

Moreover, the body 30 comprises, at a first end, intended to be facing the rear of the vehicle, a groove, or notch, 31 defining a track for guiding a pin rigidly connected to the movable panel.

The groove 31 has an opening end 311 and a bottom end 312 respectively intended to be positioned facing the track 119 and the front notch 117a of the bottom rail 115 when the end fitting 3 is inserted into the bottom rail 115.

Thus, when the movable panel is in the closed position, the front pin thereof is disposed simultaneously in the front notch 117a of the bottom rail 115 and at the bottom of the groove 31 of the end fitting 3.

In other words, the front stop comprises a body having a complementary shape with the bottom rail so as to be capable of being inserted into the front end of the bottom rail, i.e. the end of the rail located to the front of the vehicle. The body of the front stop comprises a groove, or notch, having a curved, substantially comma-shaped, shape, the end or bottom whereof is positioned facing the front notch of the bottom rail when the front stop is inserted into the bottom rail.

Moreover, the end fitting 3 comprises a plate 32 configured to close, tightly, the front end $115_E$ of the bottom rail 115 after inserting the end fitting 3.

The end fitting 3 further comprises an element for managing water present in the bottom rail and discharging it outside.

To do this, an opening 320, enabling fluidic communication between the internal space of the bottom rail 115 and the management and discharge element, is provided in the closing plate 32.

The management and discharge element comprises a vessel (not shown) for collecting water, means (not shown) for discharging water present in the vessel, and, above the level of the bottom rail 115 when the end fitting 3 is secured thereto, a portion 33 for recovering and guiding the water to the vessel.

Such a recovery and guidance portion particularly makes it possible to recover and guide/reroute to the vessel the water emerging therefrom, when the vehicle is inclined for example.

In the example illustrated, the end fitting 3 is made of one piece of a plastic material.

Moreover, the groove 31 has a curved, substantially comma-shaped, shape, in order to progressively guide the front pin of the movable panel from the track 119 to the front notch 117a. This particularly makes it possible to prevent jerks when the movable panel reaches the closed position.

The recovery and guidance portion is a trough, or chute, 33 having a substantially "U"-shaped cross-section and having a curved, substantially comma-shaped, shape.

The chute 33 has a first, so-called bottom, end, in fluidic communication with the opening 320 of the plate 32 and a second, so-called top, end substantially projecting along the axis Z so as to be disposed above the level of the body 30 of the end fitting 3.

The chute 33 is arranged and sized so that it has a side wall $33_{PL}$ facing the side wall $115_{PL}$, of the bottom rail 115, located on the exterior side of the vehicle when the end fitting is inserted into the bottom rail 115.

5.3 Second Embodiment

An example of a sealing device according to a second embodiment of the proposed technique is described with reference to FIGS. 5A to 9. Once again, only the elements of the sealing device centring around the proposed technique will be described hereinafter in order to simplify the comprehension thereof.

This second embodiment differs from the first essentially by the structure of the end fitting forming the mechanical stop, and therefore by the structure of the guide rail receiving it, as well as by the structure of the element for managing the water present in the rail and discharging it outside.

Figures 5A, 5B:
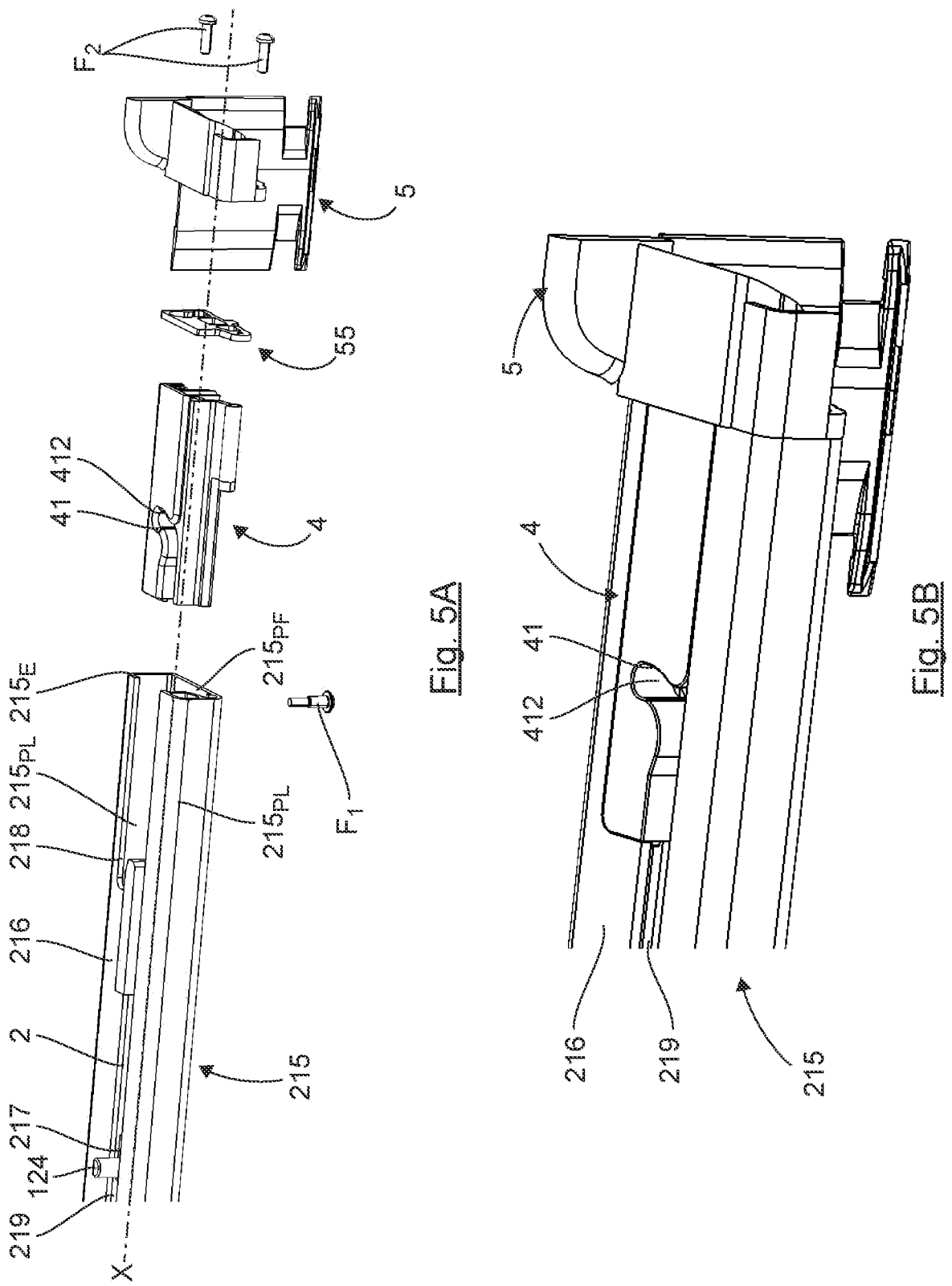
FIGS. 5A and 5B illustrate respectively exploded and assembled views of a partial example of a bottom sealing device rail equipped with an end fitting forming a mechanical stop, according to a second embodiment of the proposed technique, whereon an element for managing the water present in the rail and discharging it outside is mounted.

FIGS. 5A and 5B illustrate respectively exploded and assembled views of a front portion of a bottom sealing device rail equipped with an end fitting forming a mechanical stop, whereon an element for managing the water present in the rail and discharging it outside is mounted.

In this second embodiment, the bottom rail 215, more visible in FIG. 5A, is a profile comprising a bottom wall $215_{PF}$ and two side walls $215_{PL}$ extending perpendicularly to the bottom wall $215_{PF}$. The side wall $215_{PL}$ located on the exterior side of the vehicle comprises a return 216 which extends perpendicularly thereto and towards the vehicle interior so as to define a track 219 for moving, along the axis X, the pins 124 borne by the movable panel.

The bottom rail 215 differs from the bottom rail of the first embodiment essentially in that the return 216 has a front recess 218. The recess 218 extends, along the axis X, from the front end $215_E$ of the rail along a predetermined length and opens onto the track 219. In other words, the front recess 218 makes it possible to widen the front end of the track 219.

As illustrated in FIG. 5B, and detailed hereinafter with reference to FIGS. 6 to 7B, the front recess 218 is configured to receive/house a portion of an end fitting 4 whereon a groove 41 is arranged having an end defining a front notch 412 for receiving a front pin (not shown) borne by the movable panel when the latter is in the closed position. In other words, the front notch arranged on the return of the rail in the first embodiment is here arranged on the end fitting forming a mechanical stop.

Figure 8:
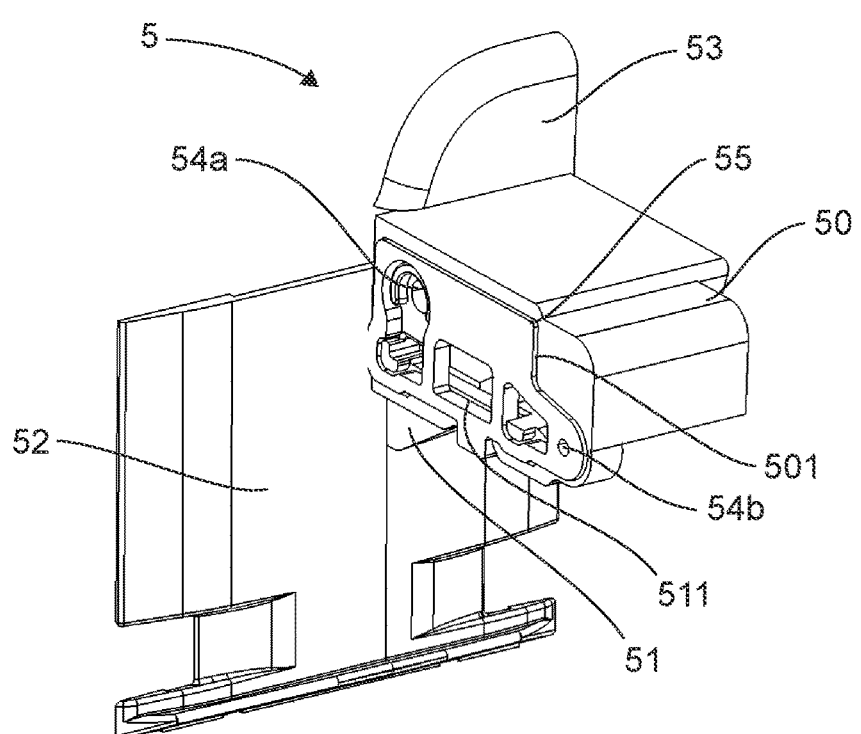
FIGS. 8 and 9 illustrate different views of the element for managing the water present in the rail and discharging it outside in FIGS. 5A and 5B.
Figure 9:
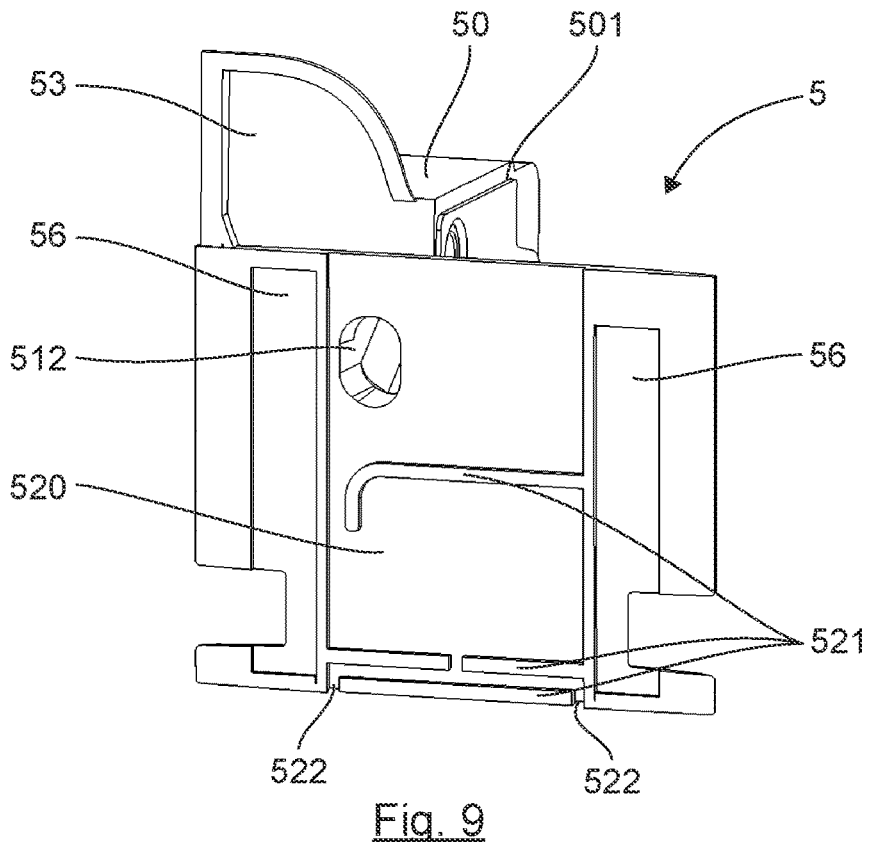

Moreover, in this second embodiment, the sealing device comprises an element 5 for managing the water present in the rail and discharging it outside separate from the end fitting 4. The management and discharge element 5, detailed hereinafter with reference to FIGS. 8 and 9, is attached to the end fitting 4 via attachment means $F_2$.

5.3.1 End Fitting Forming a Mechanical Stop

The end fitting forming a mechanical stop in FIGS. 5A and 5B is described with reference to FIGS. 6, 7A and 7B.

Figures 6, 7A, 7B:
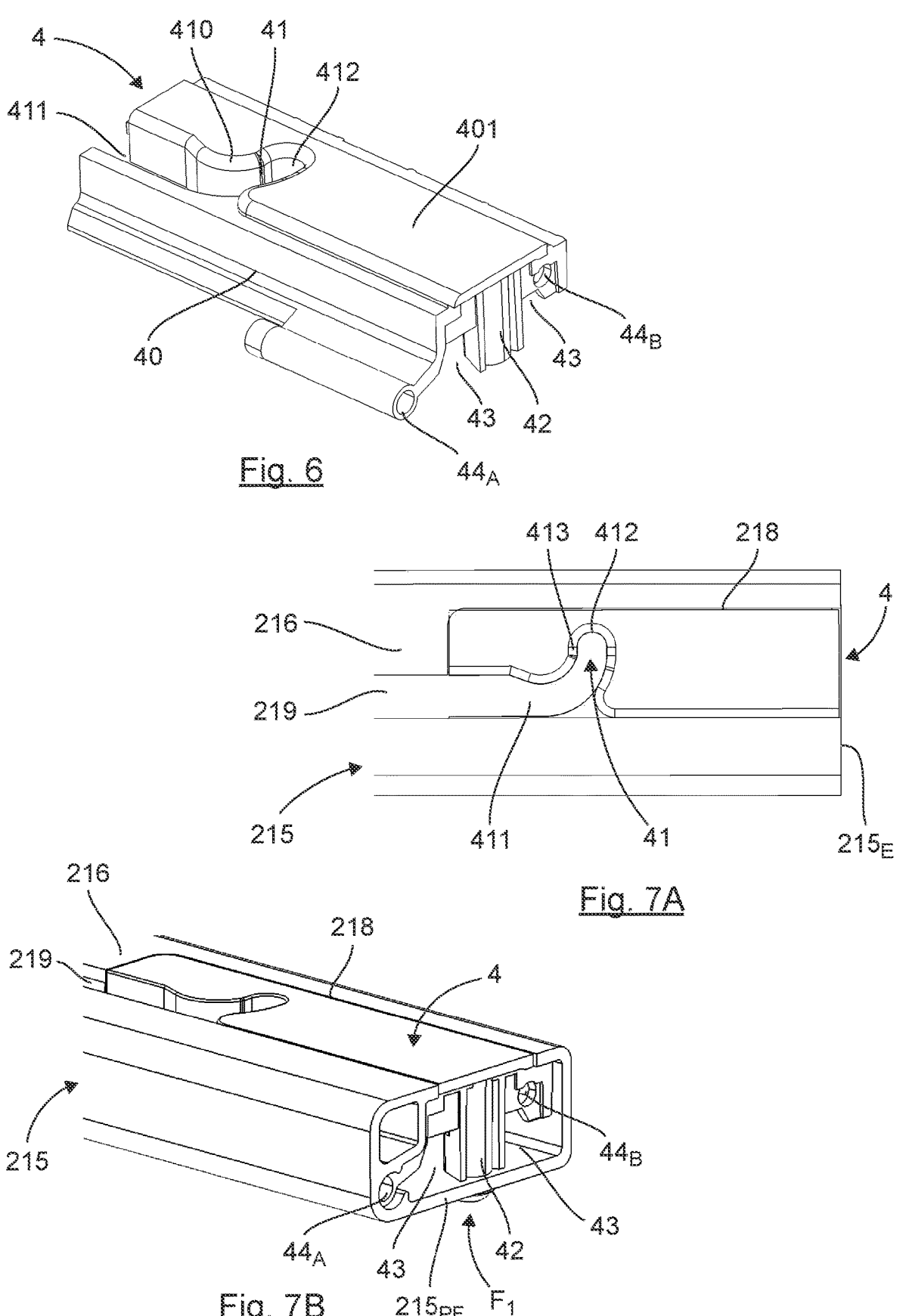
FIG. 6 illustrates an elevated perspective view of the end fitting forming a mechanical stop in FIGS. 5A and 5B.
FIGS. 7A and 7B are two views of the assembly in FIG. 5B devoid of the element for managing the water present in the rail and discharging it outside.

More specifically, FIG. 6 illustrates an elevated perspective view, in isolation, of the end fitting forming the mechanical stop in FIGS. 5A and 5B. FIGS. 7A and 7B illustrate, in top and elevated perspective views respectively, the assembly in FIG. 5B devoid of the element for managing the water present in the rail and discharging it outside.

In this second embodiment, the end fitting 4 forming a mechanical stop defining a stop position of the shuttle differs from the end fitting of the first embodiment essentially in that it comprises:

a groove 41 having an end defining a front notch 412 for receiving a front pin (not shown) borne by the movable panel when the latter is in the closed position, and attachment means 44a, 44b to an element for managing the water present in the bottom rail and discharging it outside (not shown).

To do this, the end fitting 4 comprises a body, or portion, 40 having a complementary shape with the front end $215_E$ of the bottom rail 215 and is configured to be inserted therein. In other words, the body 40 of the end fitting 4 is adapted to match/mould, at least partially, the interior of the bottom rail 215. This makes it possible, by minimising the mechanical play between the end fitting and the interior of the rail, to improve the hold of the end fitting in the rail.

The body 40 has an outer face 401 configured to be housed in the front recess 218 of the lower rail 215. The outer face 401 is furthermore configured to be located in the plane 216 of the bottom rail 215 so as not to disrupt the movement of the movable panel.

Moreover, the outer face 401 comprises, at a first end, intended to be facing the rear of the vehicle, a groove, or notch, 41 defining a track for guiding and stopping a pin rigidly connected to the movable panel.

The groove 41 has an opening end 411 and a bottom end 412 forming a recess for receiving a front pin borne by the movable panel when the latter is in the closed position. Thus, when the movable panel is in the closed position, the front pin thereof is disposed in the notch 412 of the end fitting 4.

Such a groove 41 enables the end fitting 4 to ensure, on one hand, the guidance of the pin rigidly connected to the movable panel when the latter approaches the closed position and, on the other, form (on its own) the notch for receiving this pin when the movable panel is in the closed position. Such a configuration particularly makes it possible to reduce noise nuisance when closing the movable panel, particularly when the end fitting is made of a plastic material. This results in an improvement of the comfort of the vehicle occupants.

Furthermore, the groove 41 has a curved edge 410 for connecting with the outer face 401. In other words, the outer ridge of the groove 41, i.e. the ridge onto the rail exterior, is rounded.

Such rounding particularly makes it possible to simplify the extraction of an extraneous element from the sealing device, typically a finger, of a child in particular, present in the groove. This results therefore in an improvement of the safety of the vehicle occupants.

The body 40 of the end fitting 4 defines, or has, at least one pipe 43 traversing either end of the body 40 in order to enable the water present in the bottom rail 215 to flow to the front end $215_E$ of the rail in question.

The attachment means 44a, 44b of the end fitting 4 are located at the second end of the body 40 and are oriented along the axis X in order to enable the attachment of the element for managing the water present in the rail and discharging it outside.

In the example illustrated, the end fitting 4 is made of one piece of plastic materials.

The groove 41 has a curved, substantially comma-shaped, shape, in order to progressively guide the front pin of the movable panel from the track 119 to the bottom end 412 forming the front notch.

The end fitting 4 further comprises an attachment portion 42, typically a threaded portion, configured to cooperate with a complementary attachment means F1, typically a screw, in order to secure the end fitting 4 to the bottom rail 215. Thus, when the shuttle comes into contact with the end fitting 4, given that it is secured to the rail, the end fitting 4 forms a mechanical stop defining a stop position of the shuttle.

The body 40 of the end fitting 4 comprises a recess defining, with the bottom wall $215_{PF}$ of the bottom rail 215, two pipes 43 enabling the water present in the bottom rail 215 to flow to the front end $215_E$ of the rail. Such an arrangement makes it possible to form, at least cost, effective flow pipes, particularly for the bottom sealing device rails.

The attachment means 44a, 44b are formed by two threaded portions each configured to cooperate with an attachment screw F2 traversing the element for managing the water present in the rail and discharging it outside (described hereinafter).

5.3.2 Management and Discharge Element

The element for managing water present in the rail and discharging it outside shown in FIGS. 5A and 5B is described with reference to FIGS. 8 and 9.

FIGS. 7A and 7B illustrate, in different views, an example of a management and discharge element separate from any end fitting and intended to be mounted therein.

The management and discharge element 5 is intended to be mounted and attached, by attachment means F2, to the end fitting 4, as illustrated in FIGS. 5A and 5B. The management and discharge element 5 is therefore located substantially in line with the bottom rail 215 and rigidly connected thereof via the end fitting 4.

The management and discharge element 5 comprises a vessel 51 for collecting water, means 52 for discharging the water present in the vessel 51, and a portion 53 for recovering and guiding the water to the vessel 51. Thus, the bottom rail 215 collects the water flowing along the inner face of the sealing device, then routes this water to the tank 51, which acts as a buffer zone, until the water present in the vessel is in a sufficiently large quantity to be discharged, under the effect of gravity, by the specific discharge means 52.

To do this, the vessel 51 comprises an inlet opening 511, configured to recover the water flowing from the front end $215_E$ of the bottom rail 215, and an outlet opening 512, configured to convey the water present in the vessel to the discharge means 52.

The discharge means 52 are connected to the outlet opening 512 of the vessel 51 and extending below the level of said vessel. The discharge means 52 comprise a planar portion 520 having at least one baffle 521 forcing the water to wind before discharge. Such an arrangement makes it possible to effectively discharge the water present in the vessel outside the vehicle while minimising the risk of outside water entering the management and discharge element, and therefore the sealing device.

Moreover, the planar portion 520 provides a connection between the bottom rail and the vehicle. More specifically, the planar portion 520 is assembled, via connection portions 56, on the face of the structure facing the vehicle interior. This particularly makes it possible to ensure or contribute to the holding in position of the sealing device on the structure in the event of glass breakage.

The recovery and guidance portion 53 is located above the level of the vessel 51 and therefore, above the level of bottom rail 215 when the management and discharge element 5 is connected to the bottom rail 215. Such a recovery and guidance portion particularly makes it possible to recover and guide/reroute to the vessel the water emerging therefrom, when the vehicle is inclined for example.

Moreover, the management and discharge element 5 comprises attachment orifices 54a, 54b disposed facing attachment means 44a, 44b arranged on the end fitting 4 and adapted to enable the passage of complementary attachment means F2. In other words, the management and discharge element 5 is attached to an intermediate part, namely the end fitting. This makes it possible in particular, in an environmentally responsible approach, to only replace the defective or worn element. This also makes it possible to simplify the maintenance of the sealing device, particularly the cleaning of the interior of the management and discharge element 5 in the event of obstruction.

The management and discharge element 5 further comprises a flexible member 55 intended to be engaged with the front end $215_E$ of the bottom rail 215 in order to ensure the tightness of the junction between the bottom rail 215 and the management and discharge element 5.

In the example illustrated, the management and discharge element 5 comprises a body 50 having an open end 501 of substantially complementary shape and dimensions with those of the front end $215_E$ of the bottom rail 215 in order to cooperate therewith.

The body 50 further has a hollow internal space in fluidic communication, on one hand, with the bottom rail 215 and, on the other, with the vessel 51 via the inlet opening 511 thereof. Such a hollow internal space enables the passage of the water present in the rail up to the vessel 51 located below this internal space.

The planar portion 520 of the discharge means 52 extends vertically along the axis Y in order to enable, under the effect of gravity, the discharge of the water present in the vessel 51. The planar portion 520 is of sufficient length to traverse a bonding bead securing the fixed part of the sealing device to the vehicle structure.

The discharge means 52 further have a plurality of baffles, namely four in the example illustrated, arranged so as to force the water from the vessel to wind along the planar portion 520 before being discharged by discharge openings 522 to the outside.

The recovery and guidance portion 53 has a complex shape in order to limit the size of this portion in the sealing device. Therefore, it appears that this shape varies according to the structure of the sealing device wherein it is inserted.

Moreover, the recovery and guidance portion 53 is located substantially in line with the planar portion 520 of the discharge means 52 and is arranged so as to cooperate with the inner face of the fixed part.

In the example illustrated, the attachment orifices 54a, 54b the management and discharge element 5 are intended for the attachment screw portions T2 cooperating with complementary threaded portions provided in the end fitting 4. This makes it possible to ensure simply, and reversibly, the attachment of the management and discharge element 5 to the end fitting 4.

Moreover, the flexible member 55 is, in the example illustrated, a seal of complementary shape with the cross-section of the front end $215_E$ of the bottom rail 215 mounted on the management and discharge element 5. Alternatively to the mounted seal, an over-moulding, made of a material having this function, can be produced directly on the management and discharge element 5 during the manufacture thereof.

5.3 Further Aspects and Alternative Embodiments

The two embodiments of an end fitting, forming a mechanical stop defining a stop position for a shuttle, described above have been embodied cooperating with the front end of the bottom rail of the sealing device.

However, the invention is not limited to such an implementation, but covers more generally any use of an end fitting forming a mechanical stop defining a stop position for a shuttle borne by an end of a sealing device guide rail.

For example, in an alternative embodiment not illustrated, an end of a guide rail bears an end fitting forming a mechanical stop defining a stop position for a shuttle devoid of a track for guiding a pin borne by the movable panel. Such an end fitting is particularly useful when no guidance along the axis Y is required, which can particularly be the case at the rear end of a guide rail of a sealing device. This particularly makes it possible to reduce the manufacturing costs of such an end fitting while providing the mechanical stop function.

In the two embodiments described with reference to the figures, the end fitting forming a mechanical stop defining a stop position cooperates with an element for managing the water present in the guide rail and discharging it outside. It can however be envisaged to separate the two elements mentioned above.

In this regard, it can particularly be envisaged that a first end of a guide rail bears an end fitting having a management and discharge element and that a second end of the same rail bears an end fitting devoid of a management and discharge element, but having/bearing an element for tightly closing the rail. This particularly makes it possible to reduce the manufacturing costs of such an end fitting while providing the function of discharging the water present in the rail.

According to a further example, it can be envisaged to mount an element for managing the water present in the guide rail and discharging it outside as described above, with reference to FIGS. 5A to 9 in particular, on a rail end without using an end fitting forming a mechanical stop defining a stop position for a shuttle. For example, the management and discharge element can be mounted on an end fitting (or be integral therewith), inserted in the end of the rail, not providing the function of mechanical stop defining a stop position for a shuttle.

Therefore, it is clear that the proposed technique is not limited to the embodiments described above and provided merely by way of example. It encompasses various modifications, alternative forms and other alternative embodiments that a person skilled in the art may envisage within the scope of the present invention and particularly any combinations of the different operating modes described above, that can be taken separately or in combination.

According to different aspects, the proposed technique therefore has all or some of the following advantages, according to the embodiments selected:

improving the guidance and/or stopping of the movable panel;
    contributing to, or improving, the management of the discharge of the water present in the guide rail,
    enabling a simple and effective attachment of the end fitting to the guide rail;
    ensuring a long service life of the sealing device;
    ensuring the safety of the vehicle occupants;
    ensuring simplified and/or environmentally responsible maintenance of the sealing device;
    limiting the manufacturing costs of the sealing device;
    limiting the size of the sealing device;
    improving the comfort of the vehicle occupants;
    etc.

The invention claimed is:

1. A closing device of a window provided in a structure, comprising a fixed part wherein an opening is defined, and at least one sliding movable panel guided along a top and a bottom guide rails mounted on a face of said fixed part, said movable panel being movable between:

a closed position, wherein said movable panel seals said opening, said movable panel being in a first plane, called a sealing plane, defined by said fixed part, and
    at least one opened position, wherein said movable panel is in a second plane, called a sliding plane, substantially parallel with said sealing plane,
    each of said respective guide rails housing a shuttle, each shuttle being a rod sliding in the associated guide rail, each shuttle being provided with a front track and a rear track, the movable panel including two pins, a first pin cooperating with the front track and a second pin cooperating with the rear track,
    said front and rear tracks configured to ensure that the movable panel is switched from said closed position to said at least one opened position, and vice versa, and slidably moving said movable panel in said sliding plane, when each shuttle is moved in translation in the associated guide rail,
    wherein said bottom guide rail bears, at one of the ends thereof, an end fitting that includes a track for guiding one of said pins and forming a mechanical stop defining a stop position for the corresponding shuttle,
    and wherein said end fitting bears an element for managing water from said bottom guide rail, comprising a vessel to collect the water and a conduit connected to the vessel and extending below said vessel to discharge said water outside of the structure.

2. The closing device according to claim 1, characterized in that said bottom guide rail is a profile and in said end fitting is a plastic part comprising at least one portion capable of interlocking in at least a complementary portion of said profile.

3. The closing device according to claim 1, characterized in that said end fitting is secured to said bottom guide rail by screwing.

4. The closing device according to claim 1, characterized in that said conduit comprise a planar portion having at least one baffle.

5. The closing device according to claim 4, characterized in that said element for managing water comprises, above a level of said bottom guide rail, a portion for recovering and guiding water to said vessel, particularly when said structure is inclined.

6. The closing device according to claim 4, characterized in that said planar portion provides a link between said bottom guide rail and said structure.

7. The closing device according to claim 1, characterized in that said element for managing water comprises an over-moulding and/or a seal ensuring a sealing function between said element for managing water and said bottom guide rail.

8. A motor vehicle comprising at least one closing device according to claim 1.

* * * * *